United States Patent [19]

Keresman et al.

[11] 4,123,240
[45] Oct. 31, 1978

[54] MEANS FOR INTERCEPTING WELD SPLATTER

[75] Inventors: Michael A. Keresman, Seven Hills; Curtis H. Schueuerman, Newbury, both of Ohio

[73] Assignee: Parker-Hannifin Corporation, Cleveland, Ohio

[21] Appl. No.: 806,381

[22] Filed: Jun. 14, 1977

[51] Int. Cl.² ............................................. B01D 50/00
[52] U.S. Cl. .................................. 55/385 C; 228/215; 285/286; 55/500; 55/525
[58] Field of Search ........................... 55/309–311, 55/495, 498, 500, 503, 509, 385 R, 385 C, 510, 525; 228/215; 285/286

[56] References Cited

U.S. PATENT DOCUMENTS

3,362,139  1/1968  Williamson ..................... 55/385 R

FOREIGN PATENT DOCUMENTS

156,124  1/1964  U.S.S.R. ........................... 285/286

Primary Examiner—Bernard Nozick
Attorney, Agent, or Firm—James A. Hudak; John N. Wolfram

[57] ABSTRACT

A means for preventing weld splatter produced during the welding together of two housing parts from entering a fluid passageway contained within the housing. The preventing means comprises an annular chamber located between the fluid passageway and the surfaces to be welded together and a screen contained within the chamber to cover a vent passage connecting the chamber to the fluid passageway. The screen prevents weld splatter from passing through the vent passage into the fluid passageway where it may later contaminate the fluid flowing therethrough.

12 Claims, 2 Drawing Figures

MEANS FOR INTERCEPTING WELD SPLATTER

BACKGROUND OF THE INVENTION

1. Field of the Invention

This invention relates to means for preventing weld splatter consisting of small metal particles from entering the fluid passageway in a housing and more particularly to screen means which prevents weld splatter produced during the welding of the two abutting parts of a housing from entering the fluid which subsequently passes therethrough.

2. Description of the Prior Art

In many instances abutting parts of a housing that define a fluid passageway are joined together by welding. Various methods have been utilized for welding such parts but all have some inherent disadvantages. For example, if the parts are welded together by the inert gas tungsten arc welding process, no weld splatter is produced, but weld penetration is shallow resulting in a week weld joint. Deeper weld penetration can be obtained with this welding process, but such deeper penetration usually results in deformation of the surfaces adjacent the welded joint. In contrast, the use of electron beam welding results in a weld that deeply penetrates the surfaces welded together without any deformation of the adjacent surfaces. Full penetration of the surfaces, however, usually results in the production of weld splatter on the interior wall of the fluid passageway. This weld splatter may contaminate or be entrained within fluid which subsequently flows through the passageway and may cause damage to or malfunction of a valve or other components of the fluid system in which the housing is installed.

SUMMARY OF THE INVENTION

The invention of this disclosure overcomes the aforementioned problem of weld splatter produced during the electron beam welding of housing parts entering a fluid passageway through the housing. This is accomplished by placing a screen in an annular chamber that surrounds the fluid passageway and is located between the passageway and the abutting surfaces of the housing parts that are to be welded together. The screen covers a vent passage that connects the chamber with the fluid passageway and is of sufficiently small mesh to intercept the particles of weld splatter which are produced during the welding process preventing the weld splatter from passing through the vent passage into the fluid passageway.

DESCRIPTION OF THE PREFERRED EMBODIMENT

Figure 1:
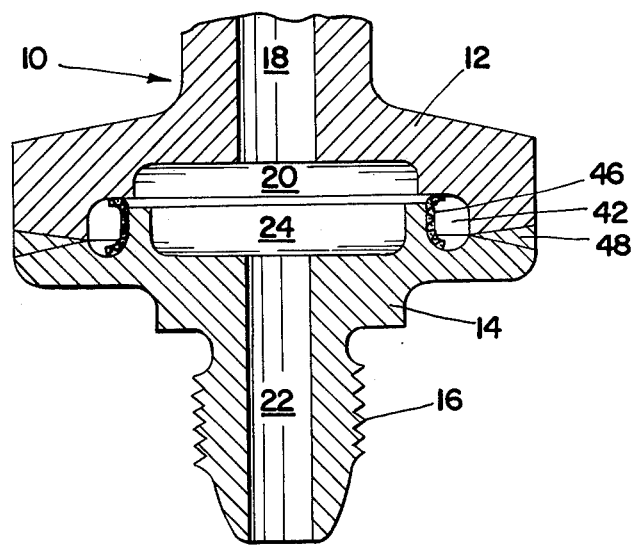
FIG. 1 is cross-sectional view illustrating a welded joint between the two parts of a housing and a screen means which intercepts weld splatter produced during the welding process.

Referring now to the drawings, FIG. 1 shows a housing 10 which, for example, may be connected to a fuel injection nozzle (not shown) for a gas turbine engine. Housing 10 is composed of a body 12 and a cover 14 having an inlet fitting 16 formed therein. Body 12 has a bore 18 formed therein with a recess 20 at one end thereof. Similarly, cover 14 has a bore 22 and a recess 24 formed therein which communicate with bore 18 and recess 20 forming a fluid passageway through housing 10. Because of the nature of the installation, body 12 and cover 14 are formed from nickel base alloys. These alloys are suitable for electron beam welding.

Figure 2:
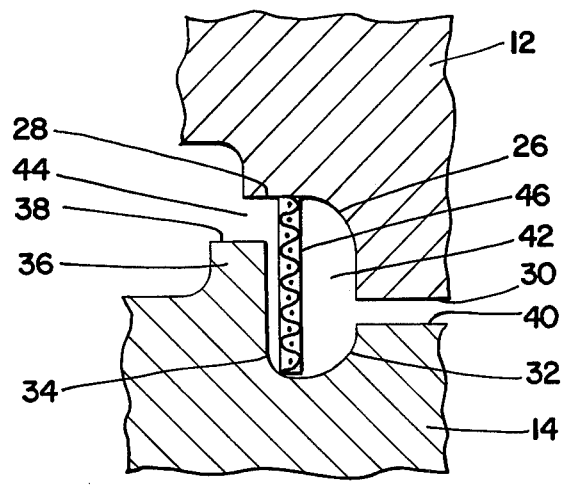
FIG. 2 is an enlarged fragmentary cross-sectional view illustrating the position of the screen prior to its deformation in its chamber.

As shown in FIG. 2, body 12 has a recess 26 that terminates in flat surface 28 and is surrounded by flat surface 30. Cover 14 has a recess 32 with a curved bottom wall 34 adjacent a tubular rim 36 that has a flat upper surface 38. A flat surface 40 having a width substantially equal to that of surface 30 surrounds recess 32. When surfaces 30 and 40 are brought together prior to welding, recess 26 and 32 form an annular chamber 42 and surface 28 and 38 will be spaced apart from each other by about 0.01 to 0.03 inch to provide a vent passage 44 connecting chamber 42 with the fluid passageway. Passage 44 permits the venting of gases from chamber 42 and this prevents bulging of the weld joint due to the heating of such gases during welding.

A screen 46 is placed in chamber 42 prior to the welding together of body 12 and cover 14. When surfaces 30 and 40 are brought together, the upper and lower ends of screen 46 are outwardly deflected by recess 26 and curved bottom wall 34 respectively as shown in FIG. 1, and are in tight engagement therewith so that gases venting from chamber 42 through passage 44 pass through screen 46. Alternatively, the upper end of screen 46 may be bent inwardly and received in passage 44 so as to be in the flow path of the gases venting from chamber 42. Screen 46 is typically formed from corrosion-resistant steel and has a mesh of sufficiently small size to prevent the passage of weld splatter particles therethrough. Typically, the mesh size is nominally 5 micrometers (microns) or smaller. Screen 46 is intially cylindrical in configuration and has an inside diameter slightly larger than the outside diameter of tubular rim 36 permitting screen 46 to be supported by the outer surface of tubular rim 36 when placed in chamber 42. The axial height of screen 46 is slightly greater than the combined height of tubular rim 36 and passage 44 so that the upper end of screen 46 is firmly held against recess 26 to prevent the admittance of weld splatter into the fluid passageway by way of passage 44 or is received in passage 44 to accomplish same.

After screen 46 has been placed in chamber 42 and surfaces 30 and 40 have been brought together, surfaces 30 and 40 are welded together by the use of the electron beam welding process fusing the metal of the body 12 and cover 14 in region 48, shown in FIG. 1. This welding process provides a welded joint across the entire radial length of surfaces 30,40 forming a very strong weld between body 12 and cover 14 without any deformation of these components. Any weld splatter produced during this welding process is intercepted by screen 46 to prevent it from passing through passage 44 into the fluid passageway in housing 10 thus ensuring that the fluid that subsequently flows therethrough will not be contaminated by weld splatter.

Variations of the present invention will be apparent to those having ordinary skill in the art and the invention is limited only by the spirit and scope of the following claims:

We claim:

1. A housing comprising a body and a cover having a flow passage therethrough and joined together by welding of adjacent surfaces thereof, a vent passage between said surfaces and said flow passage, and perforated means between said surfaces and said vent passage for preventing weld splatter produced during the welding process from passing through said vent passage while permitting gases generated during said welding process to pass through said vent passage into said flow passage.

2. The housing as defined in claim 1 wherein said surfaces are substantially flat and contact each other prior to said welding to fix the position of said cover relative to said body.

3. The housing as defined in claim 1 further including a chamber inwardly adjacent said surfaces, said vent passage connecting said chamber to said flow passage, and wherein said perforated means comprises a screen.

4. The housing as defined in claim 3 wherein said screen is located in said chamber.

5. The housing as defined in claim 4 wherein one of said body and cover has a curved surface contacted by one end of said screen upon bringing said body and cover together whereby said curved surface will curl one end of said screen.

6. The housing as defined in claim 3 wherein said weld is circumferential, said chamber is annular, and said screen is cylindrical and has its ends in tight contact with said body and cover whereby any gases passing through said vent passage must also pass through said screen.

7. The housing as defined in claim 6 wherein said screen is supported on its inside diameter by a tubular extension on one of said body and cover.

8. The housing as defined in claim 3 wherein said screen is formed of wire mesh having a mesh opening capable of retaining metal particles of a size as occurs with weld splatter.

9. The housing as defined in claim 8 wherein said wire mesh has opening 5 micrometers (microns) or smaller.

10. The housing as defined in claim 1 wherein said vent passage is a space between opposing faces on said body and cover.

11. The housing as defined in claim 10 wherein said opposing faces are spaced apart about 0.01 to about 0.03 inches to form said vent passage when said body is welded to said cover.

12. The housing as defined in claim 11 wherein said adjacent surfaces on said body and cover when abutted establish the 0.01 to 0.03 inch spacing of said faces.

* * * * *